US010275993B1

(12) United States Patent
Charlton

(10) Patent No.: US 10,275,993 B1
(45) Date of Patent: Apr. 30, 2019

(54) ROULETTE GAMING SYSTEM AND ROULETTE GAME AND METHOD OF CONDUCTING THE SAME

(71) Applicant: Doe Creek Capital LLC, Dallas, TX (US)

(72) Inventor: David Charlton, Dallas, TX (US)

(73) Assignee: Doe Creek Capital, LLC, Dallas, TX (US)

( * ) Notice: Subject to any disclaimer, the term of this patent is extended or adjusted under 35 U.S.C. 154(b) by 0 days.

(21) Appl. No.: 15/209,491

(22) Filed: Jul. 13, 2016

Related U.S. Application Data

(60) Provisional application No. 62/314,505, filed on Mar. 29, 2016, provisional application No. 62/232,836, filed on Sep. 25, 2015.

(51) Int. Cl.
*G06F 17/00* (2006.01)
*G07F 17/32* (2006.01)

(52) U.S. Cl.
CPC .......... *G07F 17/329* (2013.01); *G07F 17/322* (2013.01); *G07F 17/3248* (2013.01)

(58) Field of Classification Search
None
See application file for complete search history.

(56) References Cited

U.S. PATENT DOCUMENTS

2001/0028147 A1* 10/2001 Ornstein ............. A63F 3/00157 273/292
2007/0135203 A1* 6/2007 Nicely ...................... A63F 5/00 463/17
2008/0248849 A1* 10/2008 Lutnick ................... G07F 17/32 463/16
2009/0286585 A1* 11/2009 Walker ................ G07F 17/3244 463/17
2012/0098197 A1* 4/2012 Smith ....................... A63F 1/00 273/292
2012/0322529 A1* 12/2012 Gilbertson .............. G07F 17/32 463/17
2013/0281177 A1* 10/2013 Pececnik ............. G07F 17/3262 463/17

* cited by examiner

*Primary Examiner* — Paul A D'Agostino
(74) *Attorney, Agent, or Firm* — FisherBroyles, LLP; Rob L. Phillips

(57) ABSTRACT

A roulette system detailed herein involves modified roulette features designed to add excitement to conventional roulette. A first embodiment relates to players purchasing special chips and making wagers on multiple, consecutive random outcomes in an effort to make consecutive winning number selections. A second version relates to players placing wagers on dealer select numbers. If the dealer selects winning numbers on two or more consecutive spins of the roulette wheel, players receive an enhanced payout. In both versions, pay tables list large payouts (e.g., up to 1000 to 1) which are not the norm for roulette which has as its largest payout 35 to 1 for individual numbers.

17 Claims, 10 Drawing Sheets

ROULETTE GAMING SYSTEM AND ROULETTE GAME AND METHOD OF CONDUCTING THE SAME

CROSS-REFERENCE

This application claims priority to U.S. Patent Application No. 62/314,505 filed Mar. 29, 2016 and U.S. Patent Application No. 62/232,836 filed Sep. 25, 2015 both of which are incorporated herein for any and all purposes.

FIELD OF THE INVENTION

The embodiments of the present invention relate to a roulette gaming system involving modified roulette games.

BACKGROUND

Roulette is a very popular game of chance. One primary reason for the popularity is the simplicity of the game. Players bet on numbers between 1-35, 0 and possibly 00 and win payouts if the roulette ball lands in a corresponding numbered slot on a roulette wheel. However, while roulette is popular, roulette has not changed much in decades.

Accordingly, it would be advantageous to develop new roulette games adding excitement without changing the underlying rules of roulette.

SUMMARY

In general, the roulette system detailed herein involves modified roulette features designed to add excitement to conventional roulette. A first embodiment relates to players purchasing special chips and making wagers on multiple, consecutive random outcomes in an effort to make consecutive winning number selections. A second embodiment relates to players placing wagers on dealer select numbers. If the dealer selects winning numbers on two or more consecutive spins of the roulette wheel, players receive an enhanced payout. In both embodiments, pay tables list large payouts (e.g., up to 1000 to 1) which are not the norm for roulette which has as its largest payout 35 to 1 on individual numbers.

The roulette embodiments may be played in a live environment or via an electronic system. Electronic systems include standalone gaming devices, gaming networks, mobile devices, etc.

Other variations, embodiments and features of the present invention will become evident from the following detailed description, drawings and claims.

DETAILED DESCRIPTION

Figure 1:
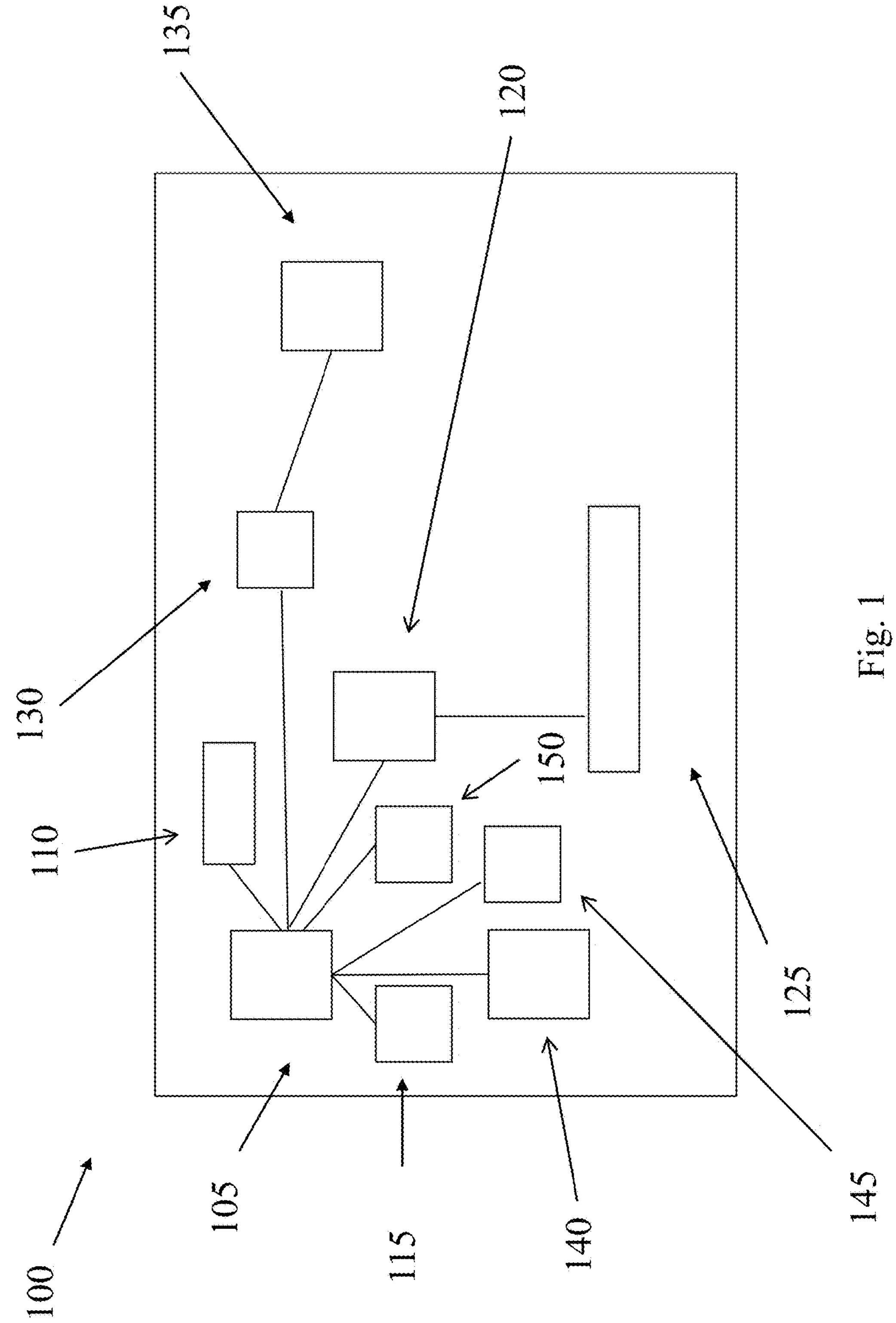
FIG. 1 illustrates a block diagram of components of an electronic gaming device for conducting a game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming device" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention may be facilitated by an electronic gaming device whereby a single player plays against the electronic gaming device's processor as described herein. The electronic gaming device may be a standalone device and bar-top device forming part of a gaming device network or not. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming device 100 may be linked to a central game server which allows players to select from a number of games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. Payout system 150 includes a coupon printer or similar device for receiving money/coupon from the electronic gaming device 100.

Those skilled in the art will recognize that the configuration and features of the electronic gaming device 100 disclosed herein are exemplary and may be altered in any number of ways without impacting the embodiments of the present invention.

Figure 2:
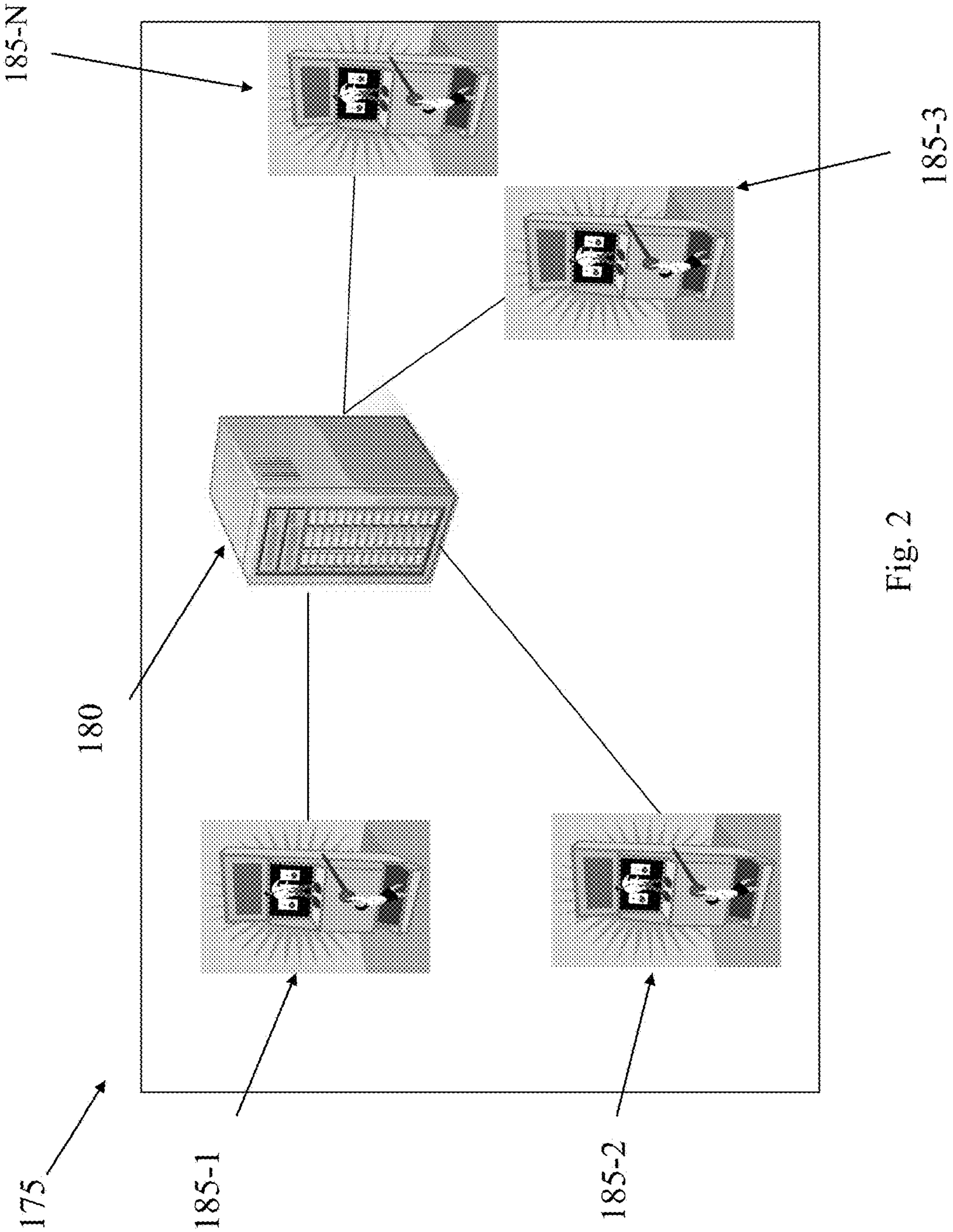
FIG. 2 illustrates a block diagram of a wireless network system including numerous slot machines according to the embodiments of the present invention.

FIG. 2 shows a block diagram of a gaming network 175 which may be used to facilitate play of the game via linked gaming devices according to the embodiments of the present invention. The gaming network 175 comprises a central processor 180 (e.g., processor-equipped game server) in communication with multiple gaming devices 185-1 through 185-N as described in FIG. 1.

Figure 3:
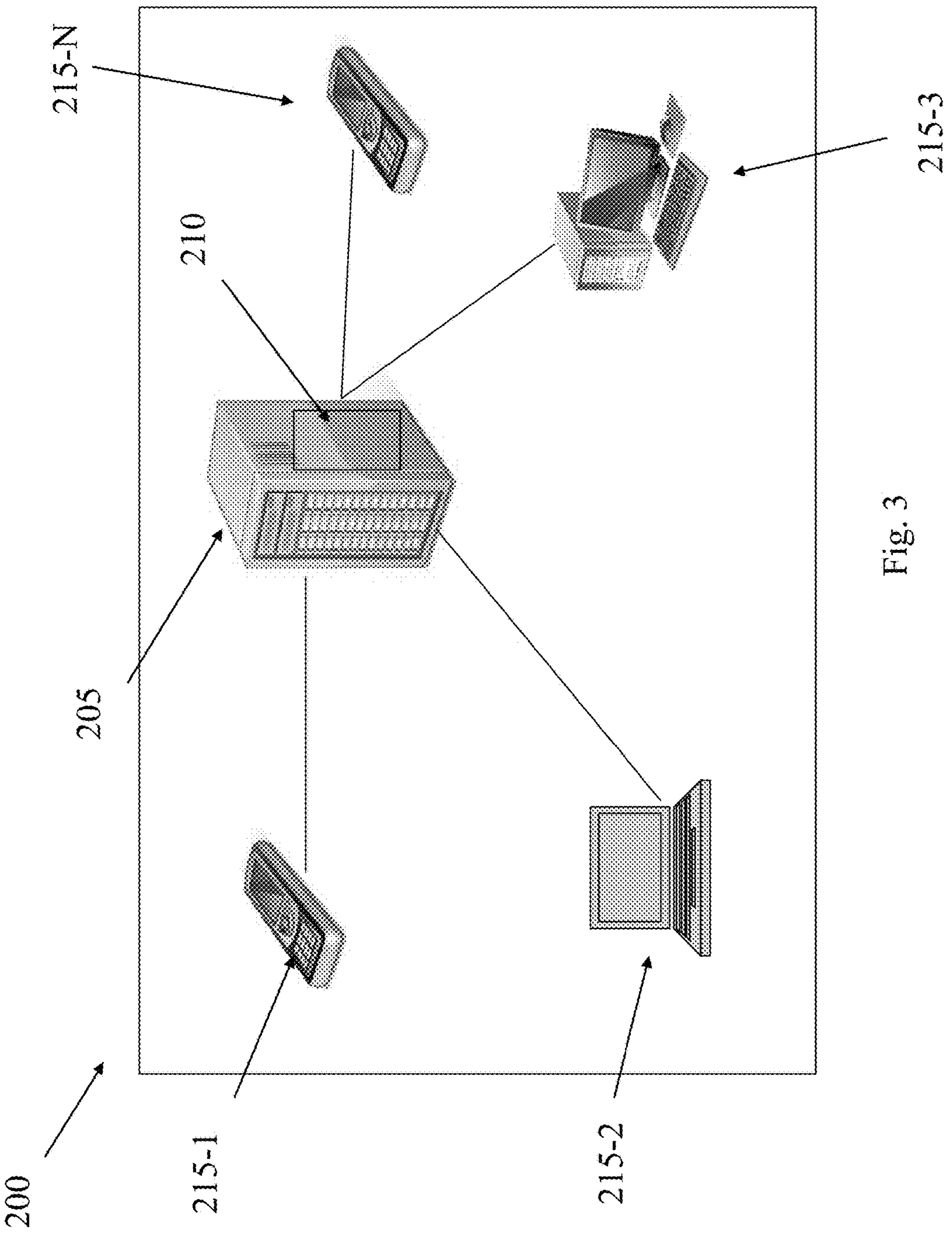
FIG. 3 illustrates a block diagram of a wireless network system accessible by mobile devices for conducting mobile games of chance according to the embodiments of the present invention.

FIG. 3 shows a block diagram of a wireless system 200 which may be used to facilitate remote play of the game according to the embodiments of the present invention. The wireless network system 200 comprises a processor-equipped game server 205, including one or more processors 210 running game software, and remote devices 215-1 through 215-N (e.g., smart phones) configured to access said game server 205 facilitating game play on the remote devices 215-1 through 215-N. In another embodiment, the video game according to the embodiments of the present invention may be in the form of a software application ("App") downloadable onto smart phones, tablets or computers and playable via processing power and a user interface associated therewith.

Figure 4:
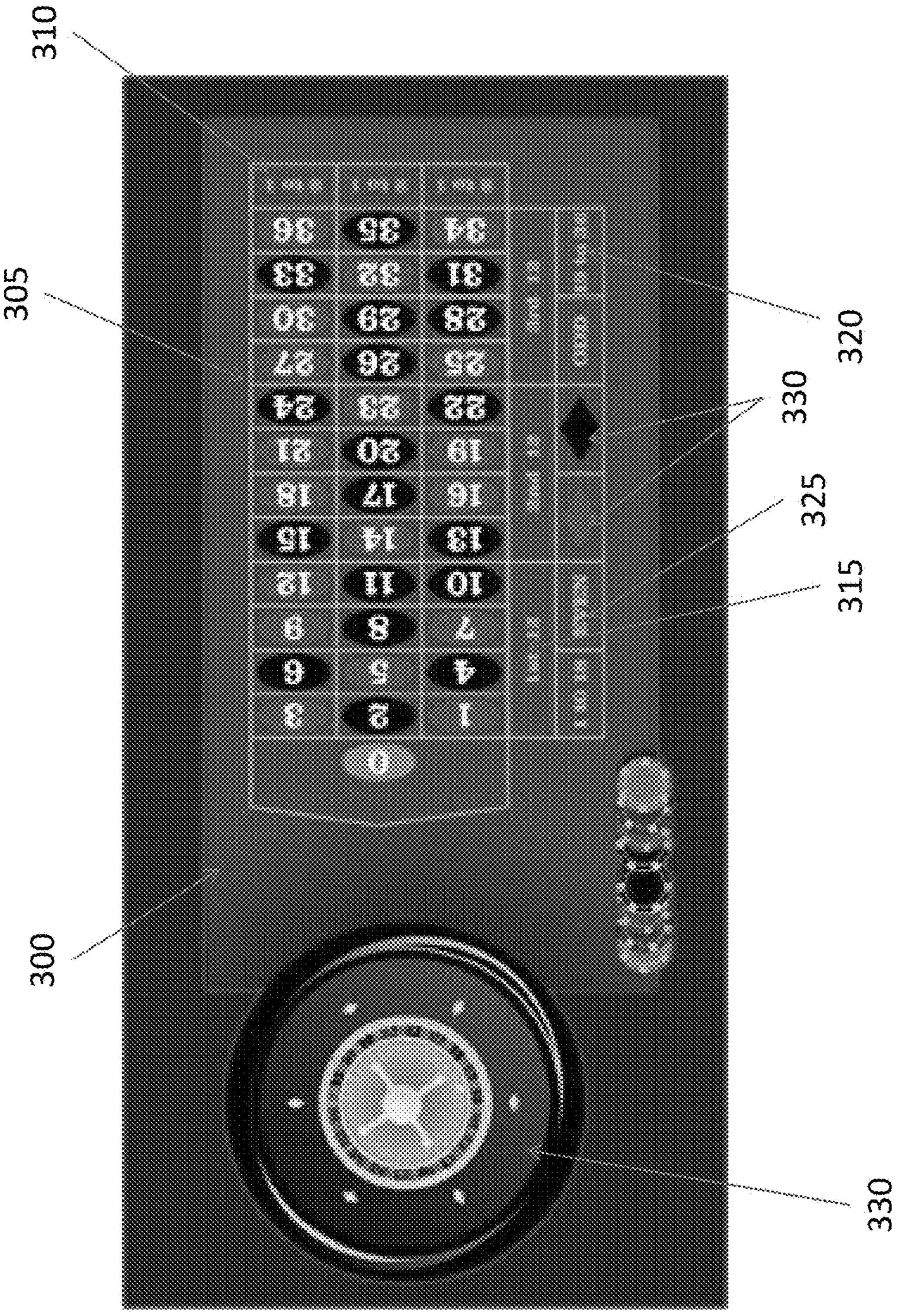
FIG. 4 illustrates a conventional roulette layout according to the prior art.

FIG. 4 shows a conventional roulette table layout 300 depicting thirty-seven number wager areas 305, column wager areas 310, twelve number wager areas 315, eighteen number wager areas 320, odd/even number wager areas 325 and red/black wager areas 330. A roulette wheel 350 and roulette ball control game outcomes.

Figure 5:
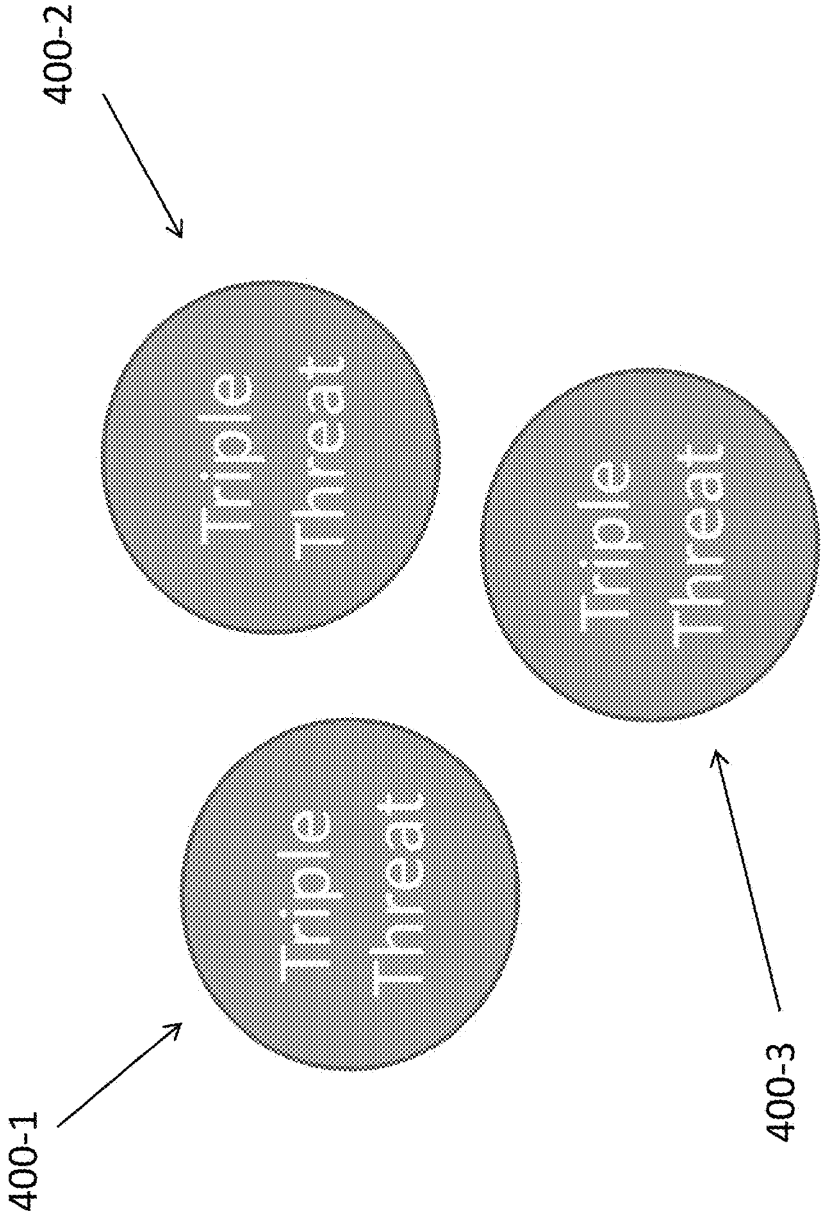
FIG. 5 illustrates a game chip according to a Triple Threat embodiment of the present invention.

A first embodiment of the present invention relates to a modified version of the roulette whereby players may place wagers on outcomes of three consecutive spins of the roulette wheel. Conventional roulette is a single outcome game such that after each spin of the roulette wheel, each wager is resolved based on the previous outcome. With the first embodiment of the present invention, as shown in FIG. 5, players may purchase special game chips 400 (aka Triple Threat game chips) distinguishable from normal single-color roulette chips but having the same colors as conventional roulette chips for purposes of tracking which player they belong to. As shown, gaming chip 400 is larger than a conventional roulette gaming chip 401. The player playing green roulette chips plays green Triple Threat game chips 400 if the player elects to purchase the same. As shown, the Triple Threat game chips 400 may depict an exemplary game name or logo associated with the "Triple Threat" wager. The group of three Triple Threat game chips 400 is purchased for a pre-established fee (e.g., $5). Exemplary pay table 450 shown in Table 1 lists payouts. The Triple Threat game chips 400 permit the dealer to track the player's wagers potentially over a series of three spins of the roulette wheel as detailed in flow chart 500 of FIG. 6. The payouts are "for 1" since the game chips 400 are forfeited win or loss.

TABLE 1

| # Spin | Payouts |
|---|---|
| First Spin Matches Number on Which a TT Game Chip is Placed | 50 for 1 |
| Second Spin Matches Number on Which a TT Game Chip is Placed | 215 for 1 |
| Third Spin Matches Number on Which a TT Game Chip is Placed | 1000 for 1 |

Figure 6:
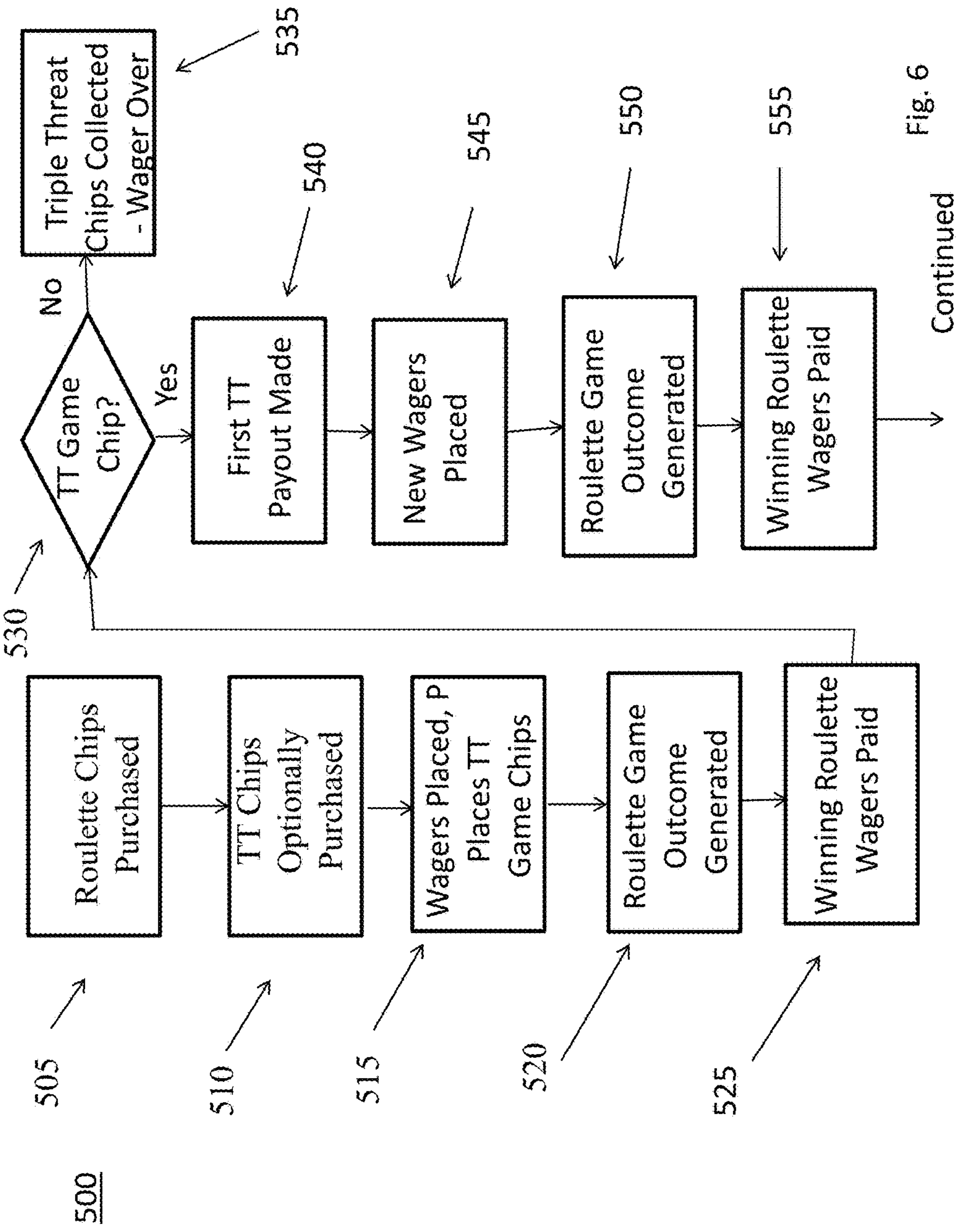
FIG. 6 illustrates a flow chart detailing a method of conducting a Triple Threat roulette game during which players may place advance wagers according to the embodiments of the present invention.
Figure 6:
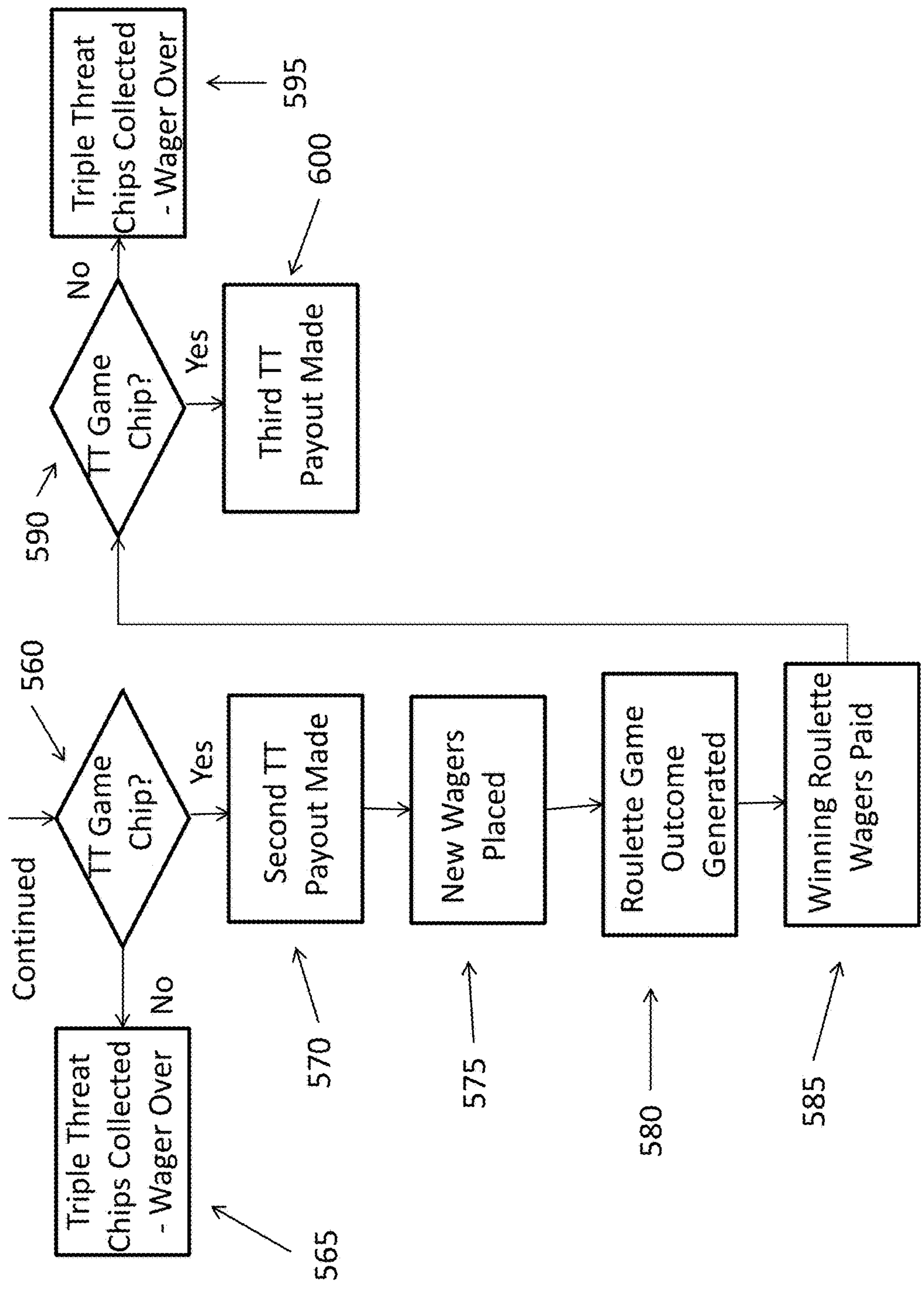

FIG. 6 shows a flow chart 500 detailing one method of conducting a roulette game according to a first embodiment of the present invention. In this version, a single player (P) places three special game chips (aka Triple Threat). Although in practice, any number of players may place the Triple Threat game chips. At 505, players purchase roulette chips. Normally players purchase $1 roulette chips which are conventionally a single color and worth $1. The roulette chips are easy to track and based on the color associate with the multiple players. Other chip denominations may be purchased. At 510, players have the option to purchase special game chips. In one embodiment, three Triple Threat chips are purchased for $5. In this instance, P purchases three Triple Threat game chips. At 515, players place conventional wagers using conventional roulette chips and P places three Triple Threat game chips on desired roulette numbers. Each of the three Triple Threat game chips must be placed simultaneously (i.e., before the same spin of the roulette wheel). The Triple Threat game chips may be placed on any of the roulette numbers and may be placed on the same roulette number if desired. The three Triple Threat game chips relate to the next three spins of the roulette wheel. The player is seeking to correctly predict multiple consecutive roulette outcomes. At 520, the roulette wheel and ball are spun and a roulette game number is randomly generated. At 525, payouts are made on winning roulette wagers. At 530, it is determined if any of the special game chips are on the roulette game number. If not, at 535, all three Triple Threat game chips are collected and removed from the table layout and the Triple Threat Wager ends. At 540, if a Triple Threat game chip is on the roulette game number, a first Triple Threat payout (see Table 1) is made to P and the first Triple Threat game chip is collected and removed while the other two Triple Threat chips of the same color remain on the table layout for at least one subsequent spin. If two or more of the same-colored special game chips are on the same number that occurs, only one is removed. At 545, new roulette wagers are placed. At 550, a new roulette number is randomly generated. At 555, winning roulette wagers are paid. At 560, it is determined if one of the two remaining Triple Threat Chips is on the new roulette number. If not, at 565, the remaining two Triple Threat game chips are collected and removed from the table layout and the Triple Threat Wager ends. At 570, if a Triple Threat game chip is on the roulette game number, a second Triple Threat payout (see Table 1) is made to P and the second Triple Threat game chip is removed while the one remaining Triple Threat chip of the same color remains on the table layout for a subsequent spin. At 575, new roulette wagers are placed. At 580, a new roulette number is randomly generated. At 585, winning roulette wagers are paid. At 590, it is determined if the final remaining Triple Threat game chip is on the new roulette number. If not, at 595, the remaining Triple Threat game chip is collected and removed from the table layout and the Triple Threat Wager ends. At 600, if the final Triple Threat game chip is on the new roulette game number, a third Triple Threat payout (see Table 1) is made to P and the third and final Triple Threat game chip is removed concluding the Triple Threat wager.

Figure 7:
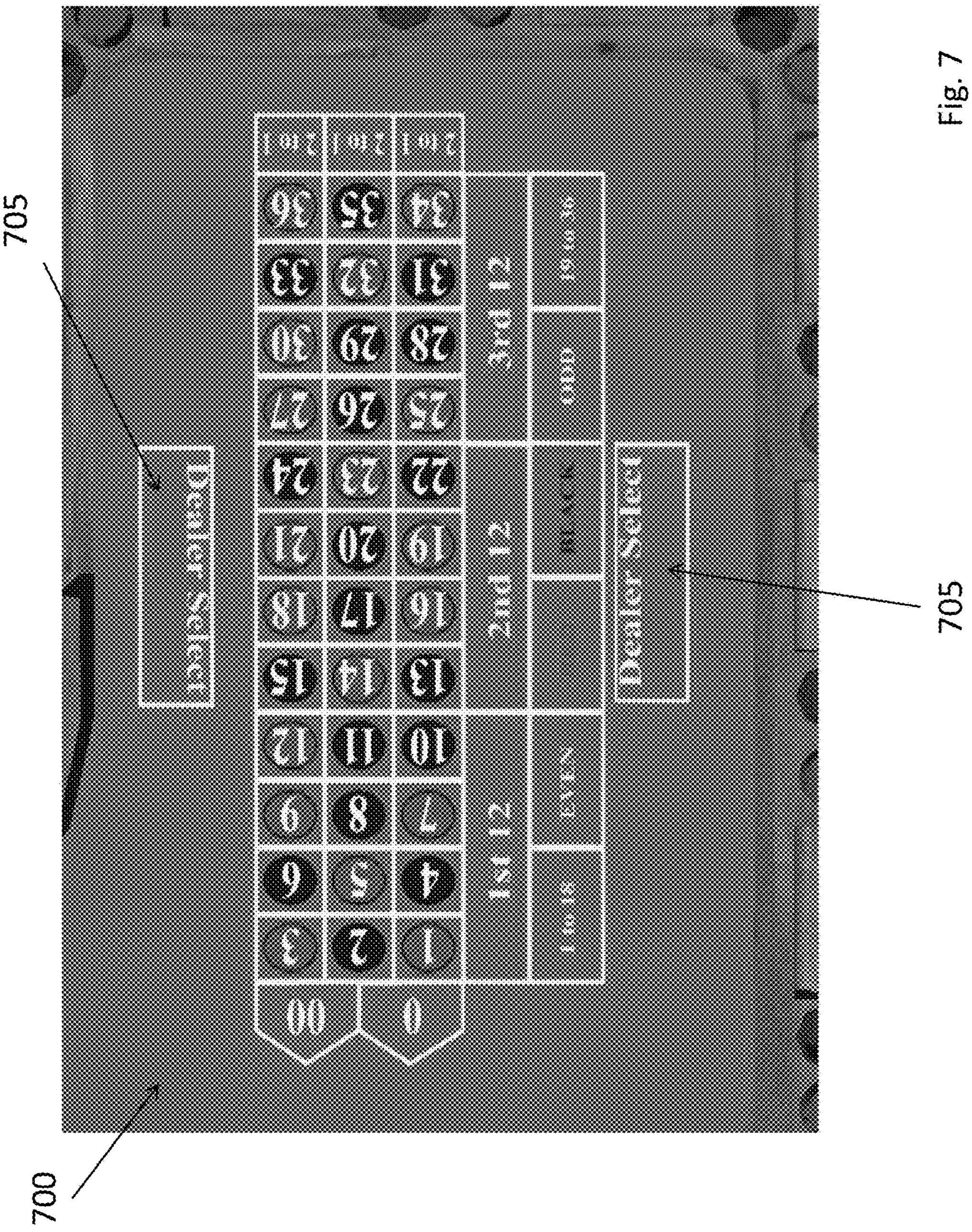
FIG. 7 illustrates a roulette layout according to a dealer select roulette game embodiment of the present invention.

Another embodiment of the present invention involves a dealer select wager contingent upon players placing wagers on a number selected by the dealer. FIG. 7 shows an exemplary dealer select roulette table layout 700. The dealer select roulette table layout 700 is similar to a conventional roulette table layout except for the addition of the dealer select wager areas 705. Like the Triple Threat wager detailed above, the dealer select wager is premised on consecutive spins (e.g., 3) of the roulette wheel and ball. In this embodiment, the dealer selects a number from the roulette wheel and if that number is the next number randomly generated by the roulette wheel and ball, players placing the dealer-select wager win a payout. If the dealer successfully selects (i.e., predicts) consecutive correct random outcomes, the payouts associated with the dealer select wager increase. In one embodiment, the pay table covers three consecutive selections. An exemplary such pay table is shown below as Table 2.

TABLE 2

| # Spin | Payouts |
|---|---|
| First Random Number Matches Dealer Selection | 35 to 1 |
| Second Random Number Matches Next Consecutive Dealer Selection | 90 to 1 |
| Third Random Number Matches Next Consecutive Dealer Selection | 1000 to 1 |

Figure 8:
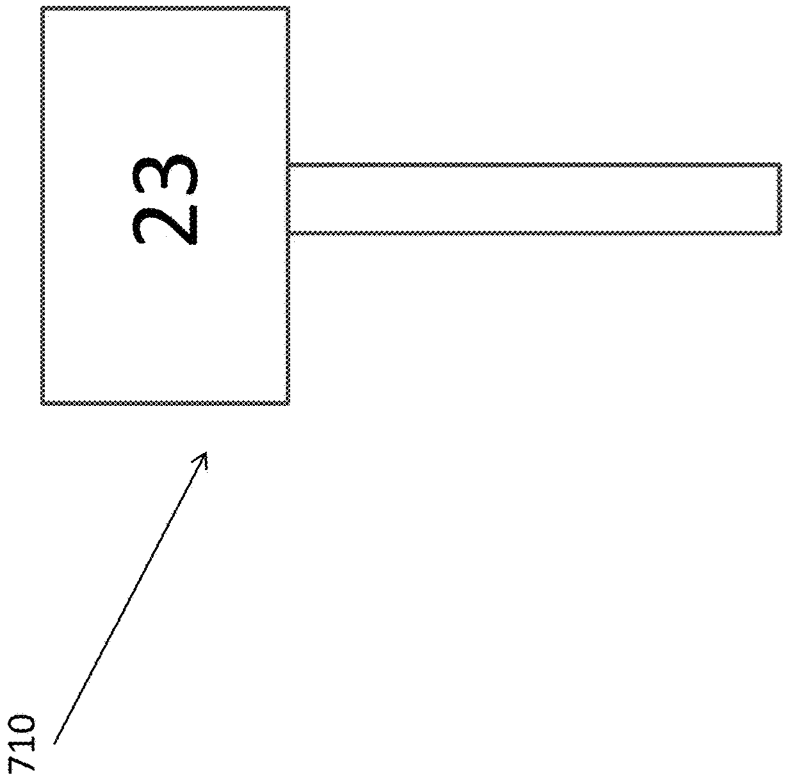
FIG. 8 illustrates a display for depicting a dealer select number according to the embodiments of the present invention.

In one embodiment, the dealer select number may be depicted on a display 710 shown in FIG. 8 prior to the upcoming spin. The dealer uses a user interface to cause the dealer select number to be depicted on the display 710. Alternatively, the dealer may place a designated marker on the selected number on the roulette table layout 700. Other means may be used to identify the dealer select number.

Figure 9:
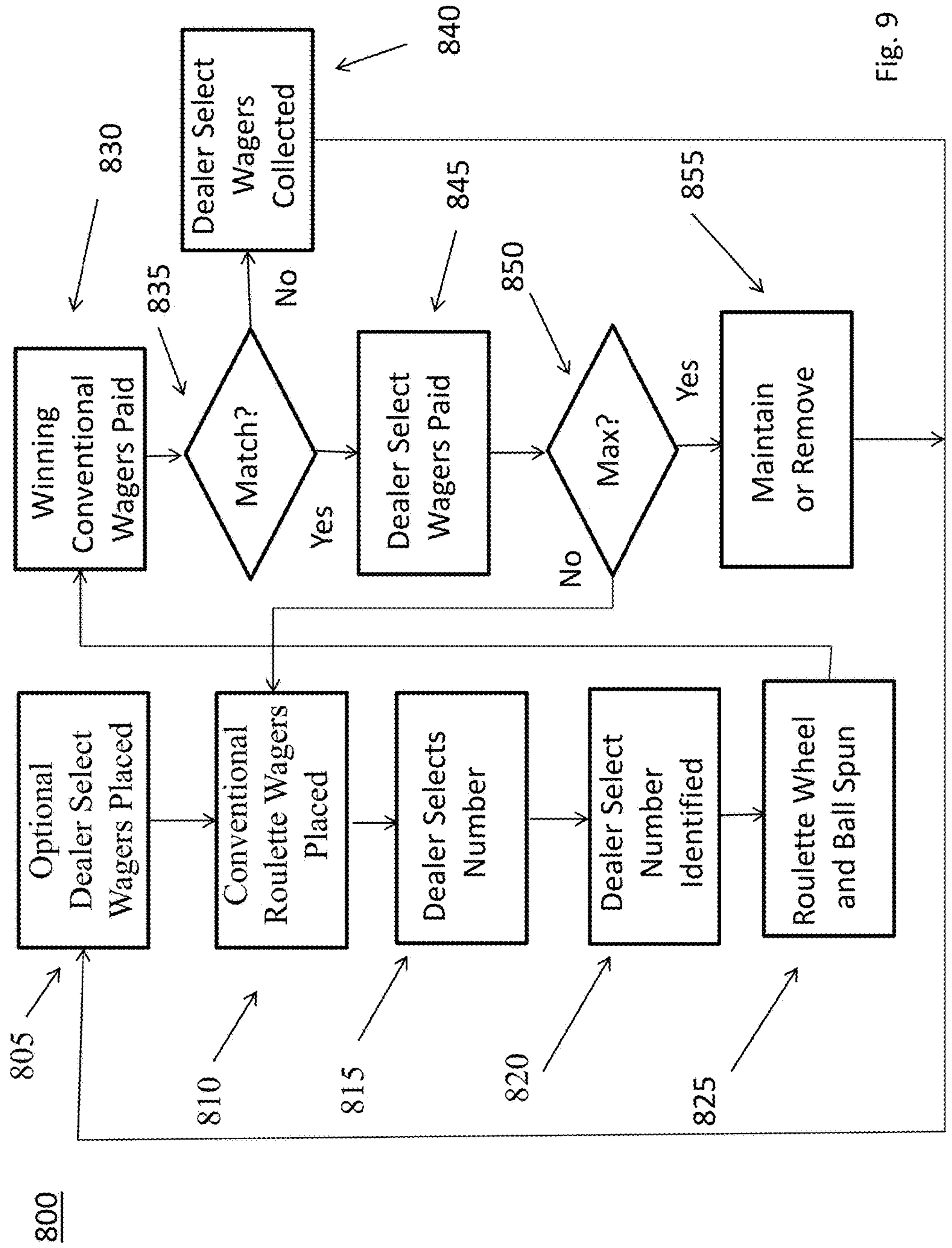
FIG. 9 illustrates a flow chart detailing a method of conducting a dealer select roulette game embodiment of the present invention.

FIG. 9 shows a flow chart 800 detailing a method of conducting a dealer select roulette embodiment of the present invention. At 805, players place optional dealer select wagers in the dealer select wager areas 705. At 810, players place conventional roulette wagers. At 815, the dealer selects a number. At 820, the dealer select number is identified using the display 710, designated marker or other means. At 825, the dealer spins the roulette wheel and ball. At 830, winning conventional roulette wagers are paid. At 835, it is determined if the randomly-generated number matches the dealer select number. If not, at 840, the dealer select wagers are collected and the flow chart 800 loops back to 805. If a match occurs, at 845, players placing the dealer select wagers receive payouts based on the consecutive number of matches achieved. At 850, it is determined if the maximum number of consecutive matches listed in the pay table have occurred. If so, at 855, players have the option to maintain or remove the dealer select wager which begins again (i.e., consecutive number re-sets to 0) such that if the next spin results in a match the payout is based on one consecutive match. Alternatively, the payout may be based on the maximum number of matches. For example, with the pay table of Table 2, a fourth consecutive match would result in the 1000 to 1 payout. If the maximum number of matches has not been achieved, the flow chart 800 loops back to 810.

Although the invention has been described in detail with reference to several embodiments, additional variations and modifications exist within the scope and spirit of the invention as described and defined in the following claims.

I claim:

1. A roulette system comprising:

a roulette wheel including a series of numbered slots;

a roulette ball;

a roulette table supporting said roulette wheel;

a roulette table layout depicting wager placement areas;

a first group of roulette game wagering chips for placement of a first type of roulette wager on said roulette table layout, said first type of roulette wager paid or collected after each spin of said roulette wheel and roulette ball;

a second group of roulette game wagering chips distinct in appearance from said first group of roulette game wagering chips for placement of a second type of roulette wager on said roulette table layout, said second type of roulette wager comprising placement of two or more of said second distinct group of roulette game wagering chips before a spin of said roulette wheel and roulette ball, said second type of roulette wager limited to wagers on one or more individual roulette numbers; and a pay table listing payouts associated with said second type of roulette wager, said payouts increasing as consecutive winning outcomes occur associated with said placement of said two or more of said second distinct group of roulette game wagering chips.

2. The roulette system of claim 1 wherein said second distinct group of roulette game wagering chips is color matched with said first group of roulette game wagering chips.

3. The roulette system of claim 1 further comprising placement of three said second distinct group of roulette game wagering chips before a spin of said roulette wheel and roulette ball.

4. The roulette system of claim 1 wherein said pay table is:

| # Spin | Payouts |
|---|---|
| First Spin Matches Number on Which a TT Game Chip is Placed | 50 for 1 |
| Second Spin Matches Number on Which a TT Game Chip is Placed | 215 for 1 |
| Third Spin Matches Number on Which a TT Game Chip is Placed | 1000 for 1. |

5. A method of conducting a roulette game utilizing a system including a roulette wheel including a series of numbered slots; a roulette ball; a roulette table supporting said roulette wheel; a roulette table layout depicting wager placement areas, comprising:

accepting a first type of roulette wager via placement of a first group of roulette game wagering chips, said first type of roulette wager paid or collected after each spin of said roulette wheel and roulette ball;

accepting a second type of roulette wager, said second type of roulette wager made via placement of two or more designated roulette game wagering chips before a spin of said roulette wheel and roulette ball, said designated roulette game wagering chips distinct in appearance from said first group of roulette game wagering chips, said second distinct type of roulette wager limited to wagers on one or more individual roulette numbers;

making payouts associated with said first type of roulette wager after each spin of the roulette wheel and roulette ball; and making payouts associated with said second distinct type of roulette wager after one or more consecutive spins of said roulette wheel and roulette ball based on a pay table listing payouts associated with said second distinct type of roulette wager, said payouts increasing as consecutive winning outcomes occur associated with said placement of said two or more of said second designated group of roulette game wagering chips.

6. The method of claim 5 further comprising color matching a second distinct group of roulette game wagering chips with a first group of roulette game wagering chips.

7. The method of claim 5 further comprising accepting placement of three said second distinct group of roulette game wagering chips before a spin of said roulette wheel and roulette ball.

8. The method of claim 5 wherein said pay table is:

| # Spin | Payouts |
|---|---|
| First Spin Matches Number on Which a TT Game Chip is Placed | 50 for 1 |
| Second Spin Matches Number on Which a TT Game Chip is Placed | 215 for 1 |
| Third Spin Matches Number on Which a TT Game Chip is Placed | 1000 for 1. |

9. An electronically-implemented method of conducting a roulette game utilizing a system including one or more gaming devices, said one or more gaming devices each having a display and user interface, said one or more gaming devices in communication with one or more processors configured to run executable instructions for:

accepting, via said user interfaces of said one or more gaming devices, a first type of roulette wager utilizing first wagering chips;

accepting, via said user interfaces of said one or more gaming devices, a second type of roulette wager utilizing second wagering chips, said second wagering chips distinct in appearance from said first wagering chips, said second type of roulette wager limited to wagers on one or more individual roulette numbers;

making payouts associated with said first type of roulette wager after each spin of a simulated roulette wheel and simulated roulette ball to generate a random game outcome utilizing a random number generator; and making payouts associated with said second distinct type of roulette wager after one or more consecutive spins of said simulated roulette wheel and roulette ball based on a pay table listing payouts associated with said second type of roulette wager, said payouts increasing as consecutive winning outcomes occur associated with said second distinct type of roulette wager.

10. The electronically-implemented method of claim 9 further comprising accepting placement of three of said second distinct wagering chips before a spin of said simulated roulette wheel and simulated roulette ball.

11. The electronically-implemented method of claim 9 wherein said pay table is:

| # Spin | Payouts |
|---|---|
| First Spin Matches Number on Which a TT Game Chip is Placed | 50 for 1 |
| Second Spin Matches Number on Which a TT Game Chip is Placed | 215 for 1 |
| Third Spin Matches Number on Which a TT Game Chip is Placed | 1000 for 1. |

12. A roulette system comprising:

a roulette wheel including a series of numbered slots;

a roulette ball;

a roulette table supporting said roulette wheel;

a roulette table layout depicting wager placement areas, including one or more dealer select wager areas wherein wagers are placed on a roulette number selected by a dealer;

means for identifying dealer selected roulette numbers; and a pay table listing payouts associated with wagers placed in said one or more dealer select wager areas, said payouts increasing as consecutive dealer selected numbers match randomly generated roulette numbers.

13. The roulette system of claim 12 wherein said pay table is:

| # Spin | Payouts |
|---|---|
| First Random Number Matches Dealer Selection | 35 to 1 |
| Second Random Number Matches Next Consecutive Dealer Selection | 90 to 1 |
| Third Random Number Matches Next Consecutive Dealer Selection | 1000 to 1. |

14. A method of conducting a roulette game utilizing a system including a roulette wheel including a series of numbered slots; a roulette ball; a roulette table supporting said roulette wheel; a roulette table layout depicting wager placement areas, comprising:

accepting wagers based on a dealer selected number;

identifying said dealer selected number via physical implement;

generating a random roulette number utilizing said roulette wheel and roulette ball;

resolving said wagers placed on dealer selected numbers according to a pay table listing payouts associated with said wagers placed on a dealer select number, said payouts increasing as consecutive dealer selected numbers match randomly generated roulette numbers.

15. The roulette system of claim 14 wherein said pay table is:

| # Spin | Payouts |
|---|---|
| First Random Number Matches Dealer Selection | 35 to 1 |
| Second Random Number Matches Next Consecutive Dealer Selection | 90 to 1 |
| Third Random Number Matches Next Consecutive Dealer Selection | 1000 to 1. |

16. An electronically-implemented method of conducting a roulette game utilizing a system including one or more gaming devices, said one or more gaming devices each having a display and user interface, said one or more gaming devices in communication with one or more processors configured to run executable instructions for:

accepting, via said user interface, wagers based on a dealer selected number;

identifying on said display said dealer selected number;

generating a random roulette number utilizing said simulated roulette wheel and simulated roulette ball, said random roulette number determined by a random number generator; and resolving, via said one or more processors, said wagers placed on dealer selected numbers according to a pay table listing payouts associated with said wagers placed on dealer selected numbers, said payouts increasing as consecutive dealer selected numbers match consecutive randomly generated roulette numbers.

17. The roulette system of claim 16 wherein said pay table is:

| # Spin | Payouts |
|---|---|
| First Random Number Matches Dealer Selection | 35 to 1 |
| Second Random Number Matches Next Consecutive Dealer Selection | 90 to 1 |
| Third Random Number Matches Next Consecutive Dealer Selection | 1000 to 1. |

* * * * *